United States Patent
Koo

(10) Patent No.: US 8,644,505 B2
(45) Date of Patent: Feb. 4, 2014

(54) REMOTE ENTITLEMENT PROCESSING MODULE INTEGRATION PROCESSING DEVICE AND METHOD

(75) Inventor: Han Seung Koo, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 76 days.

(21) Appl. No.: 13/315,777

(22) Filed: Dec. 9, 2011

(65) Prior Publication Data

US 2012/0148042 A1 Jun. 14, 2012

(30) Foreign Application Priority Data

Dec. 10, 2010 (KR) .................. 10-2010-0125942

(51) Int. Cl.
*H04N 7/167* (2011.01)
(52) U.S. Cl.
USPC .................. 380/210; 380/240; 713/172
(58) Field of Classification Search
USPC .............. 380/210, 43, 277, 45, 240; 713/171, 713/172
See application file for complete search history.

(56) References Cited

U.S. PATENT DOCUMENTS

| | | | | |
|---|---|---|---|---|
| 6,466,671 B1* | 10/2002 | Maillard et al. | .............. | 380/227 |
| 7,043,020 B2* | 5/2006 | Maillard et al. | .............. | 380/227 |
| 7,333,610 B2* | 2/2008 | Dallard et al. | ................ | 380/239 |
| 7,379,548 B2* | 5/2008 | Revital et al. | ................ | 380/240 |
| 2003/0174844 A1* | 9/2003 | Candelore | ...................... | 380/277 |
| 2004/0168063 A1* | 8/2004 | Revital et al. | ................ | 713/172 |
| 2005/0055551 A1* | 3/2005 | Becker et al. | ................ | 713/171 |
| 2010/0020963 A1* | 1/2010 | Candelore | ...................... | 380/43 |

FOREIGN PATENT DOCUMENTS

| | | | |
|---|---|---|---|
| KR | 100950599 B1 | | 3/2010 |
| KR | 1020100091505 A | | 8/2010 |

* cited by examiner

*Primary Examiner* — Samson Lemma
(74) *Attorney, Agent, or Firm* — William Park & Associates Patent Ltd.

(57) ABSTRACT

There is provided a remote entitlement processing module integration processing device. The remote entitlement processing module integration processing device includes: a remote entitlement processing module generating and managing remote smart cards (RSCs) having the number corresponding to the number of host terminals managed by the remote entitlement processing module integration processing device; and a descrambler transferring channel selection information in response to a selection of a pay channel by a user to the remote entitlement processing module and descrambling a scrambled channel signal using a control word (CW) received as a response to the channel selection information, thereby making it possible to minimize dependency between a subscriber device and a conditional access system.

10 Claims, 3 Drawing Sheets

REMOTE ENTITLEMENT PROCESSING MODULE INTEGRATION PROCESSING DEVICE AND METHOD

CROSS-REFERENCE TO RELATED APPLICATIONS

This application claims the benefit of priority of Korean Patent Application No. 10-2010-0125942 filed on Dec. 10, 2010, all of which are incorporated by reference in their entirety herein.

BACKGROUND OF THE INVENTION

1. Field of the Invention

The present invention relates to a remote entitlement processing module integration processing device, and more particularly, to a remote entitlement processing module integration processing device applied to a conditional access system in a broadcasting and communication system.

2. Related Art

A conditional access system (CAS) is a system of authorizing only authenticated subscribers to view pay broadcasting. To this end, a terminal of the conditional access system includes a function of managing a conditional access key and descrambling scrambled reception signals using the conditional access key so that the scrambled reception signals may be viewed. This function is called an entitlement processing module.

According to the related art, a 'smart card' serving as the entitlement processing module has been installed and operated in a set-top box side, which is a broadcasting signal receiving device. That is, the conditional access key is stored in the 'smart card' and is used in order to descramble the scrambled reception signals.

Therefore, broadcasters have replaced the smart card whenever conditional access operators need to be replaced or existing conditional access devices need to be upgraded, which causes an increase in a cost such as a budget, a time, and the like.

SUMMARY OF THE INVENTION

The present invention provides a remote entitlement processing module integration processing device capable of minimizing dependency between a subscriber device and a conditional access system and preventing an increase in a cost such as a budget, a time, and the like, caused by replacement of the smart card by having a 'smart card' disposed at a head-end side rather than a terminal side in a system having a two-way channel connected thereto.

The present invention also provides a remote entitlement processing module integration processing method capable of minimizing dependency between a subscriber device and a conditional access system and preventing an increase in a cost such as a budget, a time, and the like, caused by replacement of the smart card.

In an aspect, a remote entitlement processing module integration processing device is provided. The remote entitlement processing module integration processing device includes: a remote entitlement processing module generating and managing remote smart cards (RSCs) having the number corresponding to the number of host terminals managed by the remote entitlement processing module integration processing device; and a descrambler transferring channel selection information in response to a selection of a pay channel by a user to the remote entitlement processing module and descrambling a scrambled channel signal using a control word (CW) received as a response to the channel selection information, wherein the remote entitlement processing module and the descrambler form a security channel.

A remote entitlement processing module integration processing device according to an exemplary embodiment of the present invention may include a remote entitlement processing module generating and managing remote smart cards (RSCs); and a descrambler transferring channel information corresponding to a selection of a channel by a user to the remote entitlement processing module and descrambling a scrambled channel signal based on a control word (CW) received from the remote entitlement processing module.

The remote entitlement processing module and the descrambler may transmit the channel information and the CW through a security channel, wherein the security channel is based on at least one of a transfer layer security (TLS) scheme and a secure socket layer (SSL) scheme.

The remote entitlement processing module may generate and manage the RSCs having the number corresponding to the number of descramblers managed by the remote entitlement processing module integration processing device.

The RSC may determine the number of control words transmitted to the descrambler based on at least one of a speed of a two-way network connecting the remote entitlement processing module and the descrambler to each other and storage capability of the descrambler.

A remote entitlement processing module integration processing method according to another exemplary embodiment may include: transferring, in a descrambler, channel information corresponding to a selection of a channel by a user to a remote entitlement processing module; performing, in an RSC included in the remote entitlement processing module, authorization inspection in order to inspect whether the descrambler was authorized so as to use the channel; transmitting, in the remote entitlement processing module, a CW to the descrambler in the case in which the descrambler passes through the authorization inspection; and descrambling, in the descrambler, a scrambled channel signal based on the CW.

The remote entitlement processing module and the descrambler may transmit the channel information and the CW through a security channel, wherein the security channel is based on at least one of a TLS scheme and an SSL scheme.

The remote entitlement processing module may include the RSCs having the number corresponding to the number of descramblers managed by a remote entitlement processing module integration processing device.

The RSC may determine the number of control words transmitted to the descrambler based on at least one of a speed of a two-way network connecting the remote entitlement processing module and the descrambler to each other and storage capability of the descrambler.

DESCRIPTION OF EXEMPLARY EMBODIMENTS

Figure 1:
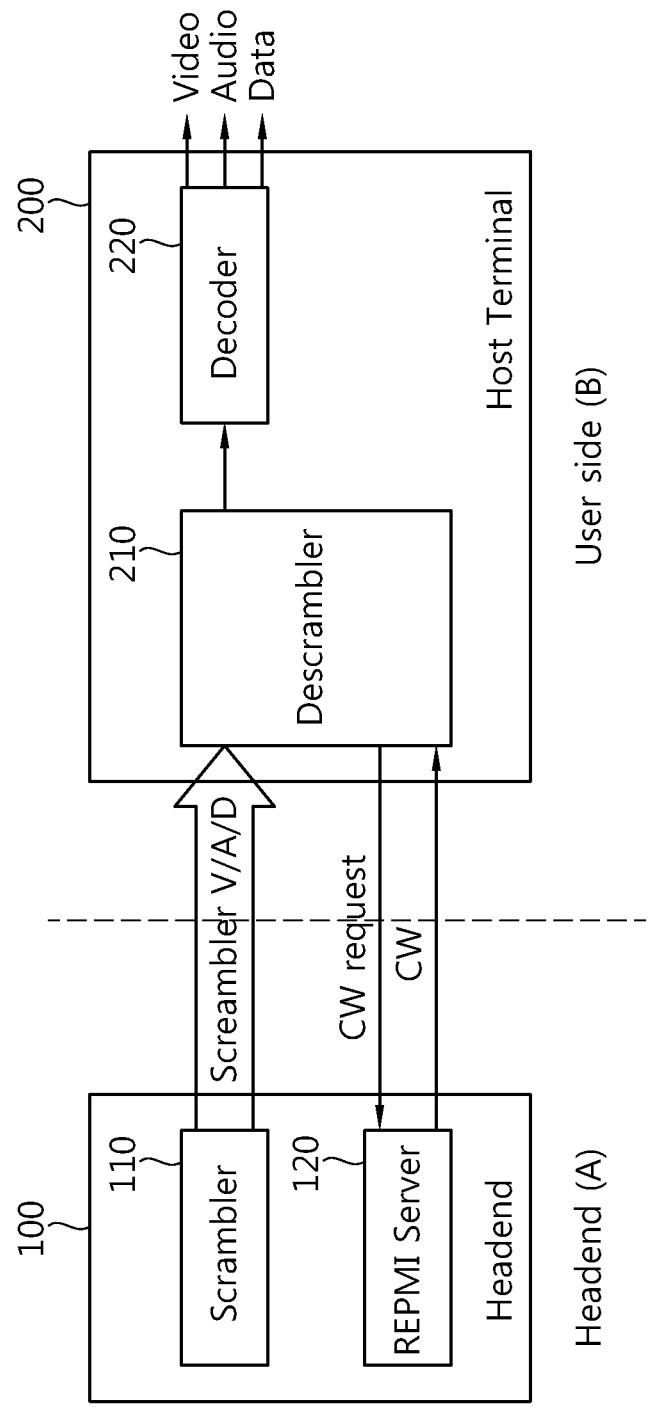
FIG. 1 is a diagram showing a structure of a remote entitlement processing module integration processing system according to an exemplary embodiment of the present invention.

Hereinafter, exemplary embodiments of the present invention will be described in detail with reference to the accompanying drawings so that those skilled in the art may easily practice the present invention. However, the present invention may be modified in various different ways and is not limited to the exemplary embodiments provided in the present description. In the accompanying drawings, portions unrelated to the description will be omitted in order to obviously describe the present invention, and similar reference numerals will be used to describe similar portions throughout the present specification. Further, when a detailed description is omitted, only a detailed description of portions that may be easily understood by those skilled in the art will be omitted.

Through the present specification and claims, unless explicitly described otherwise, "comprising" any components will be understood to imply the inclusion of other components rather than the exclusion of any other components.

In the present specification, a portable terminal is not limited to a portable phone. That is, in the present specification, the portable terminal generally represents all portable devices having a communication function, a camera function, and an image editing function.

FIG. 1 is a diagram showing a structure of a remote entitlement processing module integration processing system according to an exemplary embodiment of the present invention.

Referring to FIG. 1, the remote entitlement processing module integration processing system according to the exemplary embodiment of the present invention is divided into a user side B including a host terminal 200 such as a set-top box, or the like, and a head-end side A including a remote entitlement processing module integration (REPMI) server storing and managing a remote smart card.

The head-end side A, that is, a head-end system 100 includes a scrambler 110 and the REPMI server 120. The scrambler 110 scrambles input videos/audios/data to output the scrambled videos/audios/data. The REPMI server 120 stores remote smart cards (RSCs) corresponding to each of a plurality of host terminals and transfers a corresponding control word (CW) to a corresponding host terminal when a request is made from the corresponding host terminal.

The host terminal 200 includes a descrambler 210 and a decoder 220. The descrambler 210 receives and descrambles the scrambled signals (the scrambled video/audio/data) from the scrambler 110 of the head-end system 100 to output the descrambled signals to the decoder 220, and the decoder 220 divides the descrambled signal into videos/audios/data to output the divided videos/audios/data.

As described above, in the remote entitlement processing module integration processing device shown in FIG. 1, the smart card is moved toward the head-end side. Therefore, the descrambler 210 included in the host terminal 200 requests the REPMI server 120 of the head-end side for the control word (CW) for descrambling, and the REPMI server 120 receives the control word (CW) from the smart card managed by the REPMI server 120 to transfer the control word to the descrambler 210. Here, the descrambler 210 and the REPMI server 120 form a security channel using a transfer layer security (TLS) or secure socket layer (SSL) scheme in order to request the control word (CW) and protect a CW value from a hacker.

Figure 2:
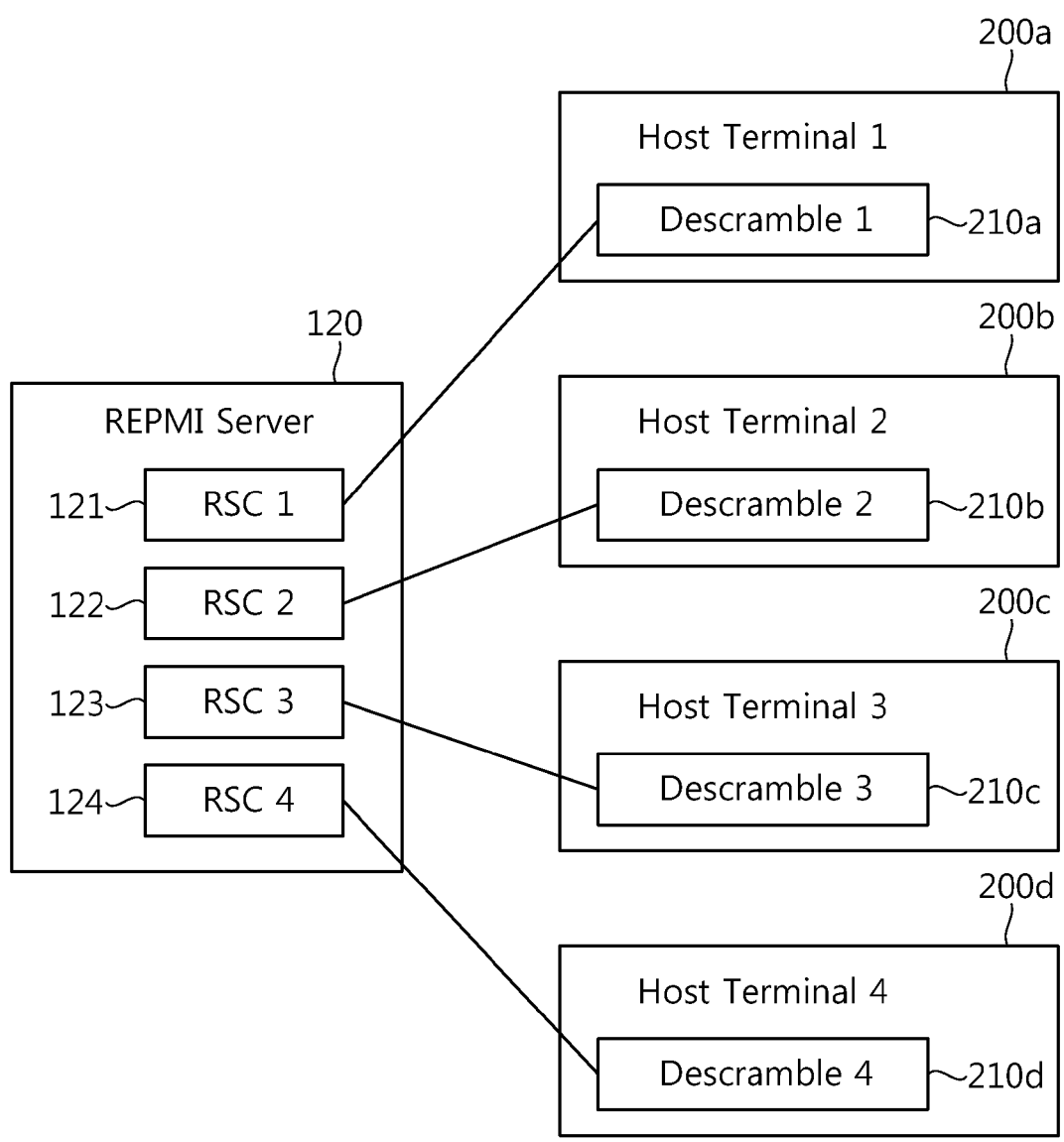
FIG. 2 is a diagram showing an example in which a remote entitlement processing module integration (REPMI) server and a descrambler in a host terminal shown in FIG. 1 are connected to each other.

FIG. 2 is a diagram showing an example in which a REPMI server and a descrambler in a host terminal shown in FIG. 1 are connected to each other. FIG. 2 shows an example in which four remote smart cards (RSCs) are stored in the REPMI server 120. The REPMI server 120 generates, stores, and manages the RSCs having the number corresponding to the number of host terminals that is to be managed by the REPMI server 120. Each of a plurality of RSCs generated as described above is connected to different descramblers and receives and manages identification information of descramblers and host terminals connected thereto in advance.

Figure 3:
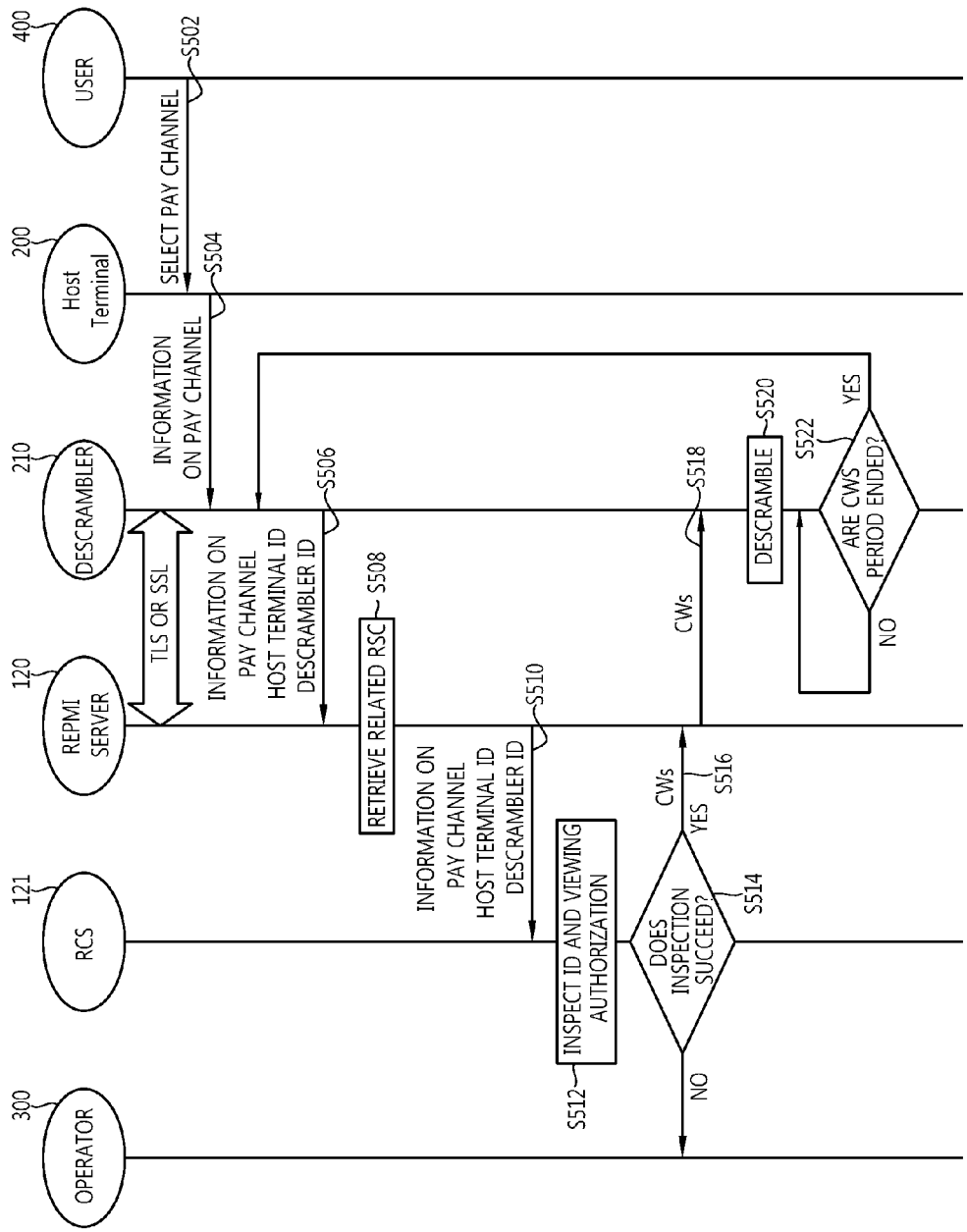
FIG. 3 is a diagram showing an operation sequence of the remote entitlement processing module integration processing system according to the exemplary embodiment of the present invention.

FIG. 3 is a diagram showing an operation sequence of the remote entitlement processing module integration processing system according to the exemplary embodiment of the present invention. Referring to FIG. 3, the REPMI server 120 and the descrambler 210 form the security channel using the 'TLS or SSL' scheme of which security and performance are verified. Then, when a user 400 selects a pay channel (S502), and the host terminal 200 transfers information on a corresponding pay channel to the descrambler 210 (S504). Thereafter, the descrambler 210 transmits the information on the pay channel, a host terminal identification (ID), and a descrambler ID to the REPMI server 120 (S506). At this time, the descrambler 210 transmits the above-mentioned information to the REPMI server 120 through the security channel set in the previous operation. Meanwhile, in the above-mentioned operation (506), the REPMI server 120 receiving the information on the pay channel, the host terminal ID, and the descrambler ID confirms ID information of the host terminal 200 and the descrambler 210 using the above-mentioned information, retrieves a related RSC (S508), and then transfers the above-mentioned information to the related RSC (S510). That is, the REPMI server 120 transmits the information received from the host terminal 200 to a corresponding RSC 121 based on the above-mentioned information.

Next, the RSC 121 confirms whether the received ID values of the host terminal and the descrambler coincide with the ID values of the host terminal and the descrambler received in advance and managed by the RSC 121, and performs authorization inspection in order to inspect whether a corresponding device was authorized so as to view pay broadcasting that the corresponding device requests in the case in which they coincide with each other (S512). When the corresponding device passes through the authorization inspection (S514), the RSC 121 generates a single CW or a plurality of CWs (S516) and then transmits the CW (or the CWs) to the descrambler 210 of a corresponding host terminal through the REPMI server 120 (S518). At this time, how many CWs are generated at a time is determined according to a speed of a two-way network and storage and processing capability of the descrambler in the host terminal. In addition, the RSC allows information required for performing the descrambling using the CW, such as a use period of the CW, or the like, to be included in the CW. On the other hand, when the authorization inspection in operation (S512) fails, the RSC 121 informs an operator of a failure state without transferring the CW.

Meanwhile, the descrambler 210 receiving the CW descrambles a corresponding channel using the CW (S520). Finally, when the use period of the received single CW or the received plurality of CWs is ended (S522), movement to operation (S504) is made and a new single CW or a new plurality of CWs are requested.

According to the exemplary embodiment of the present invention, it is possible to minimize dependency between a subscriber device and a conditional access system. In addition, broadcasters need only to replace a remote smart card in a remote entitlement processing module integration (REPMI) server with a remote smart card manufactured with a new manufacture without replacing smart cards or set-top boxes themselves of subscribers as in the related art in the case in which a manufacturer of a conditional access system needs to be replaced. Further, even though a function of a used conditional access system is changed or modified, the broadcasters need only to simply replace an existing RSC with an upgraded RSC in the REPMI server without individually replacing the smart cards of the subscribers Therefore, the broadcasters may not only replace a manufacturer of a conditional access system at a low cost but also minimize a maintenance cost according to the replacement of the smart card.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A remote entitlement processing module integration processing system comprising:
   a head-end system including a remote entitlement processing module configured to generate and manage remote smart cards (RSCs); and
   a descrambler configured to transfer channel information corresponding to a selection of a channel by a host terminal to the remote entitlement processing module and descrambling a scrambled channel signal based on a control word (CW) received from the remote entitlement processing module,
   wherein the host terminal is implemented by hardware.

2. The remote entitlement processing module integration processing system of claim 1, wherein the remote entitlement processing module and the descrambler transmit the channel information and the CW through a security channel.

3. The remote entitlement processing module integration processing system of claim 2, wherein the security channel is based on at least one of a transfer layer security (TLS) scheme and a secure socket layer (SSL) scheme.

4. The remote entitlement processing module integration processing system of claim 1, wherein the remote entitlement processing module generates and manages the RSCs having the number corresponding to the number of descramblers managed by the remote entitlement processing module integration processing device.

5. The remote entitlement processing module integration processing system of claim 1, wherein the RSC determines the number of control words transmitted to the descrambler based on at least one of a speed of a two-way network connecting the remote entitlement processing module and the descrambler to each other and storage capability of the descrambler.

6. A remote entitlement processing module integration processing method comprising:
   transferring, in a descrambler, channel information corresponding to a selection of a channel by a host terminal to a remote entitlement processing module of a head-end system;
   performing, with a remote smart card (RSC) included in the remote entitlement processing module, an authorization inspection in order to inspect whether the descrambler was authorized so as to use the channel;
   transmitting, in the remote entitlement processing module, a control word (CW) to the descrambler in the case in which the descrambler passes through the authorization inspection; and
   descrambling, in the descrambler, a scrambled channel signal based on the CW,
   wherein the step of transmitting is performed by hardware.

7. The remote entitlement processing module integration processing method of claim 6, wherein the remote entitlement processing module and the descrambler transmit the channel information and the CW through a security channel.

8. The remote entitlement processing module integration processing method of claim 7, wherein the security channel is based on at least one of a transfer layer security (TLS) scheme and an secure socket layer (SSL) scheme.

9. The remote entitlement processing module integration processing method of claim 6, wherein the remote entitlement processing module includes the RSCs having the number corresponding to the number of descramblers managed by a remote entitlement processing module integration processing device.

10. The remote entitlement processing module integration processing method of claim 6, wherein the RSC determines the number of control words transmitted to the descrambler based on at least one of a speed of a two-way network connecting the remote entitlement processing module and the descrambler to each other and storage capability of the descrambler.

* * * * *